United States Patent [19]

Van Huis et al.

[11] 4,059,071
[45] Nov. 22, 1977

[54] POULTRY CAGE SYSTEM WITH CONTROLLED FEEDER

[75] Inventors: Robert L. Van Huis, Zeeland; Charles T. Carten, Grand Rapids, both of Mich.

[73] Assignee: U.S. Industries, Inc., New York, N.Y.

[21] Appl. No.: 708,359

[22] Filed: July 26, 1976

Related U.S. Application Data

[63] Continuation of Ser. No. 590,695, June 26, 1975, abandoned, which is a continuation-in-part of Ser. No. 477,698, June 26, 1974, abandoned.

[51] Int. Cl.² ............................................. A01K 39/00
[52] U.S. Cl. .................... 119/18; 119/51.12; 119/63
[58] Field of Search ............ 119/18, 51 R, 63, 52 AF, 119/51.12

[56] References Cited

U.S. PATENT DOCUMENTS

| | | | |
|---|---|---|---|
| 3,234,914 | 2/1966 | Wormgoor | 119/63 |
| 3,333,573 | 8/1967 | Wotring | 119/51 R |
| 3,492,971 | 2/1970 | Keen et al. | 119/18 |
| 3,916,837 | 11/1975 | Murto | 119/18 |

*Primary Examiner*—Hugh R. Chamblee
*Attorney, Agent, or Firm*—Price, Heneveld, Huizenga & Cooper

[57] ABSTRACT

A poultry cage with controlled feeder includes a cage with a feed trough mounted thereon and having a feed carrier in the trough, a movable top cover over the trough which prevents access to the trough and a control associated with the top cover and the drive means for the feed carrier for displacing the cover to permit access to the trough at predetermined intervals. The control permits distribution by the carrier of feed through the whole trough before the top cover is moved and the birds are allowed to feed.

8 Claims, 7 Drawing Figures

4,059,071

POULTRY CAGE SYSTEM WITH CONTROLLED FEEDER

This is a continuation of application Ser. No. 590,695 filed June 26, 1975, entitled POULTRY CAGE SYSTEM WITH CONTROLLED FEEDER, which was a continuation-in-part of application Ser. No. 477,698 filed June 26, 1974, entitled CONTROLLED FEEDER, both now abandoned.

BACKGROUND OF THE INVENTION

The present invention relates to a poultry cage system and in particular to a cage system with a controlled feeder.

Poultry cage systems conventionally utilize chain conveyors for conveying feed through feeder troughs to feed the poultry in the cages. Such chain conveyors and feeder trough systems customarily are mounted along the sides of a row of poultry cages.

Such feeding systems are particularly useful since the conveyor allows substantial automation of the feeding process.

In controlled raising of poultry, it is highly desirable to monitor the amount of food intake of each animal being raised. Since most conventional conveyor systems move feed down a trough which is aligned next to a substantial number of cages, one problem which occurs using such conveying systems is that the birds whose cages are nearest the source of feed being supplied along the conveyor, have an opportunity to eat feed from the conveyor, as the conveyor moves along. Thus, birds further down the conveyor feed trough system do not receive their allocated food supply while the nearer birds receive greater than their allocated supply.

Because of the necessity of the close control of food intake per bird to maximize feeding economics, such conveyor feeder trough systems are wasteful.

SUMMARY OF THE INVENTION

Accordingly, it is an object of the present invention to provide a poultry cage system with a controlled feeder whereby close control of feed to each bird will be provided.

It is a further object of the present invention to provide a means for using a feed trough whereby food may be equally distributed in front of each bird in each cage before the birds are allowed access to it.

These and other objects are accomplished in the present invention by a cage system having controlled feeding apparatus which includes a series of cages with a feeding trough mounted thereon. The feeding trough has a feed carrier and a movable cover means preventing access to the trough until the feed is distributed throughout the trough by the carrier, and control means operably associated with the cover means and the drive means for the feed carrier for carrying the feed into the trough and then displacing the cover means to permit access to the trough at predetermined intervals.

In the preferred embodiment of this invention, a conventional feeder trough for poultry is utilized in conjunction with a feed carrier, e.g., chain conveyor, and a movable top cover over the feeding trough. When food is being distributed by the feed carrier through the trough, the top cover is in a closed position. After distribution of the food through the trough by the feed carrier, the top cover is opened permitting poultry, held in adjacent cages to have equal access to the food contained in the trough.

In the preferred embodiment, the means for opening and closing the top cover over the trough includes a cable assembly extending along the poultry cages and being attached to the cover at various positions therealong. As a pulling force is exerted on the cable, the cover is pulled into a closed position and as the cable is released, the cover is moved into an open position permitting feeding. The control means for the feed carrier is selectively engageable to turn on the carrier when the top cover is closed and to turn off the carrier when the cover is open.

DESCRIPTION OF THE PREFERRED EMBODIMENT

Figure 1:
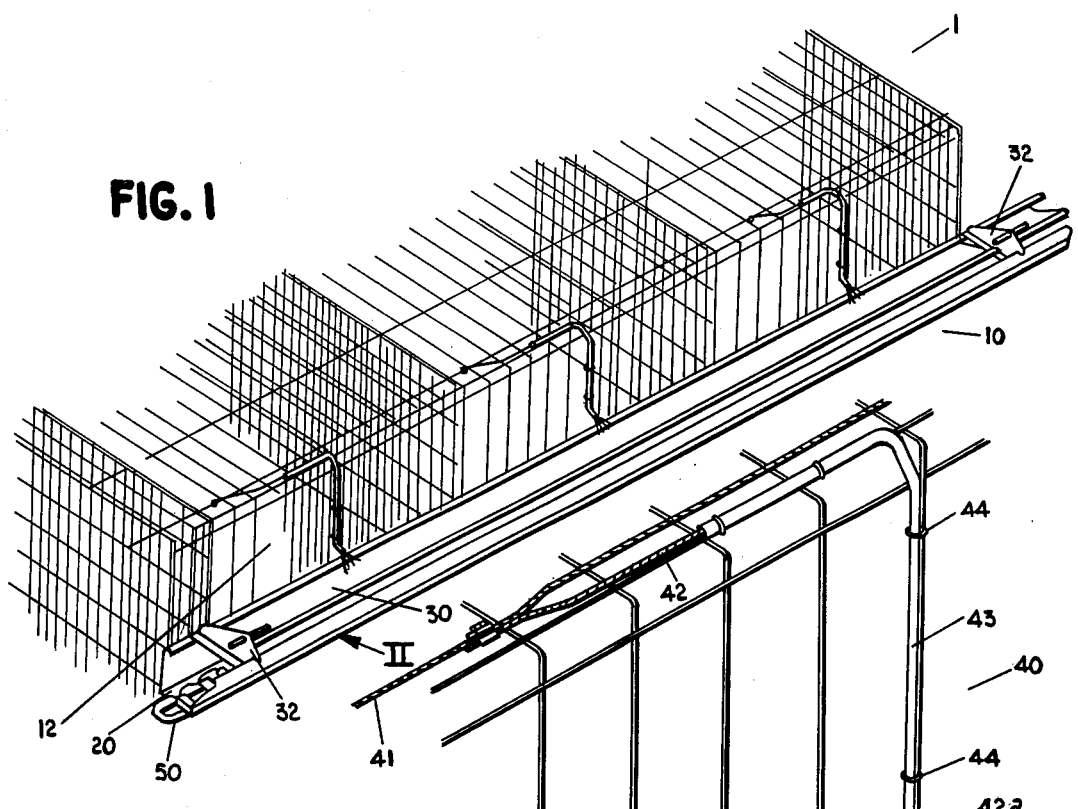
FIG. 1 is a perspective view of a set of poultry cages with the control feeding apparatus of the present invention attached thereto.

Referring to the drawings, the cage system of this invention includes a series of in-line interconnected poultry cages 1 having mounted therein a trough feeder 10. As seen therein, feeder 10 includes feeding trough 20 which is fixedly mounted onto poultry cages 1, a feed carrier which is an endless chain conveyor 50 movably located within the trough 20, and a movable top cover assembly 30 which when in its closed position (FIG. 6) prevents access by poultry to feed distributed along the bottom of feeding trough 20 by conveyor 50. Conversely when in its open position (FIG. 5), the cover assembly 30 allows access to feed contained in feeding trough 20 by poultry contained in cages 1. Feeder 10 further includes an actuator means 40 that is mounted along cages 1 and operably connected to the top cover assembly 30 to provide a means for opening and closing top cover 13.

Cages 1 are exemplary of any one of a number of conventionally available poultry cages which are customarily mounted in-line and adjacent to each other to save space. Each cage normally houses a certain number of birds and comprises along a common edge portion thereof enlarged mesh patterns 1a (FIG. 1) which allow poultry to reach out of cages 1 into feeding and watering apparatus placed thereby.

The feeder 10 is mounted along poultry cages 1 adjacent the large mesh portions 1a therein (FIG. 1) to permit poultry contained in cages 1 to reach feed contained in feeder 10.

Figure 5:
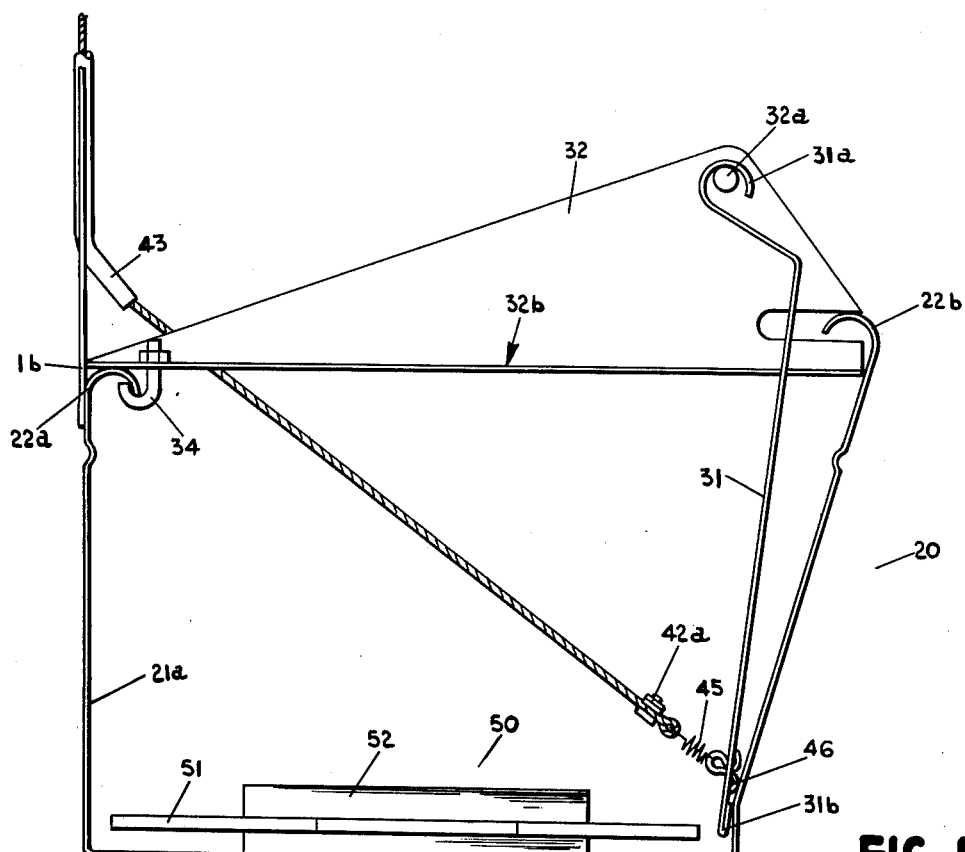
FIG. 5 is a side end view of the controlled feeder taken from V of FIG. 3.
Figure 6:
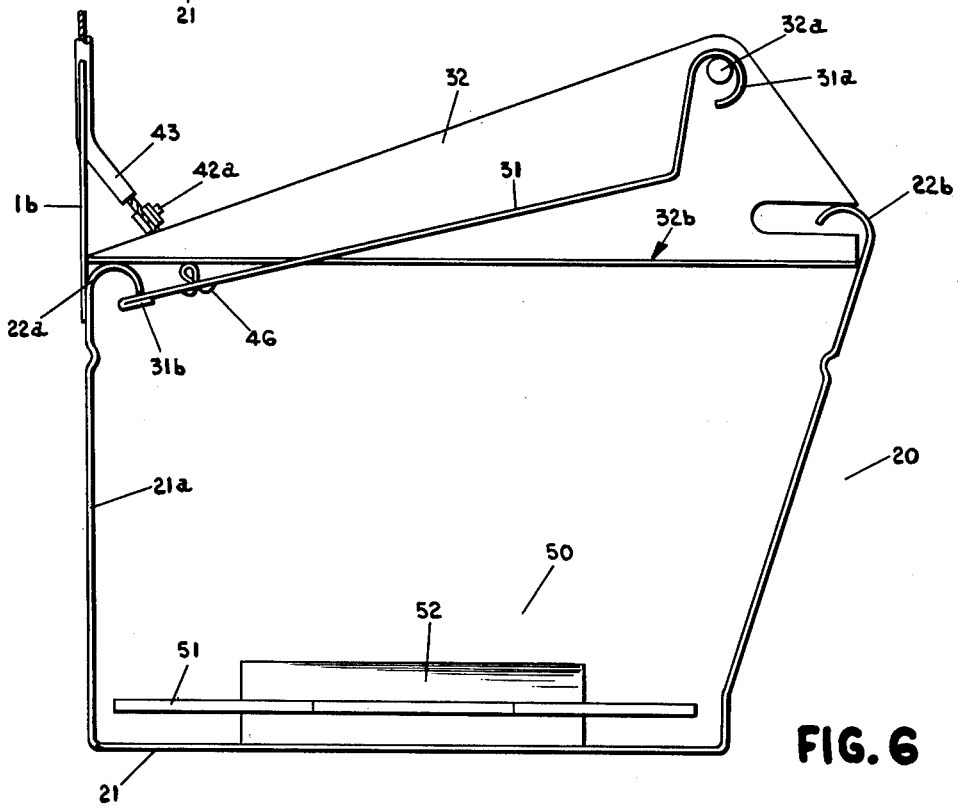
FIG. 6 is an end view of the controlled feeder taken from VI of FIG. 4.

As seen in FIGS. 1-6, trough 20 includes a flat base portion 21 and along its upwardmost top portions, inwardly directed trough lips 22a and 22b (best shown in FIGS. 5 and 6). Trough 20 is attached to wire members 1b of poultry cages 1 and at its lower and innermost to the cages portions 21a actually forms a part of the wall section of cages 1.

Feeding trough 20 is suitable for incorporating therein any one of a number of conventional feed carrier devices, which act to move feed from a place remote from poultry cages 1 for distribution along base 21 of feeding trough 20.

The feed carrier shown is a conventional chain conveyor 50. As is apparent in FIGS. 4–6, chain conveyor 50 includes interconnecting links 51 which are plate-like. The links 51 are connected as a continuous belt by rings 52 which secure the plate-like links in spaced relation above the floor of the trough 20. Examples of chain conveyors and the means for driving the same are found in U.S. Pat. No. 3,444,986 to Van Huis, U.S. Pat. No. RE. 27,035 to Van Huis, and U.S. Pat. No. 3,124,104 to Carpenter et al.

Trough cover assembly 30 includes trough cover 31 which is mounted onto trough 20 by means of trough cover support 32.

Trough cover 31 is elongated, planar and generally rectangular in shape so as to conform generally with the shape of the top of trough 20. Each end of trough cover 31 includes a curled portion 31a which acts as a means for pivotally mounting the top cover 31.

Trough cover support 32 (best shown in FIGS. 2–6) is generally triangular in shape and includes protruding knob members 32a which extend laterally from support 32 at the apex of the triangularly shaped support 32. At respective ends of the base portion of the triangularly shaped support 32, means are positioned thereon for securing support 32 to trough 20. Specifically, on the base end of support 32 outwardmost from the poultry cages, a slot 33 which is slidably insertable onto lip 22b of trough 20 is formed in support 32. At the other end of support 32 a J-bolt assembly 34 is conjunction with a flat base portion 32b integrally formed on the bottom of cover support 32 is used to anchor cover support 32 to lip 22a of trough 20 (best shown in FIGS. 5 and 6).

As is readily apparent from the figures, top cover 31 is secured to and pivotally mounted on top cover support 32 by slidable insertion of curled portion 31a of top cover 31 over protrusion 32a of cover support 32. As is also apparent in these figures, top cover 31 extends throughout trough 10 in the preferred embodiment as multiple sections extending between supports 32. If suitable support means were utilized in the cover assembly, trough cover 31 could be integrally formed for the extent of trough 20.

As shown in FIGS. 5 and 6, trough cover 31 is movable from an open position (FIG. 5) wherein its outwardmost end portion 32b extends vertically downward and touches a wall portion of the trough 20 near base 21, while top cover 31 is movable upward to a position where its outwardmost end 31b engages curled portion 22a of trough 20 (FIGS. 6).

Figure 2:
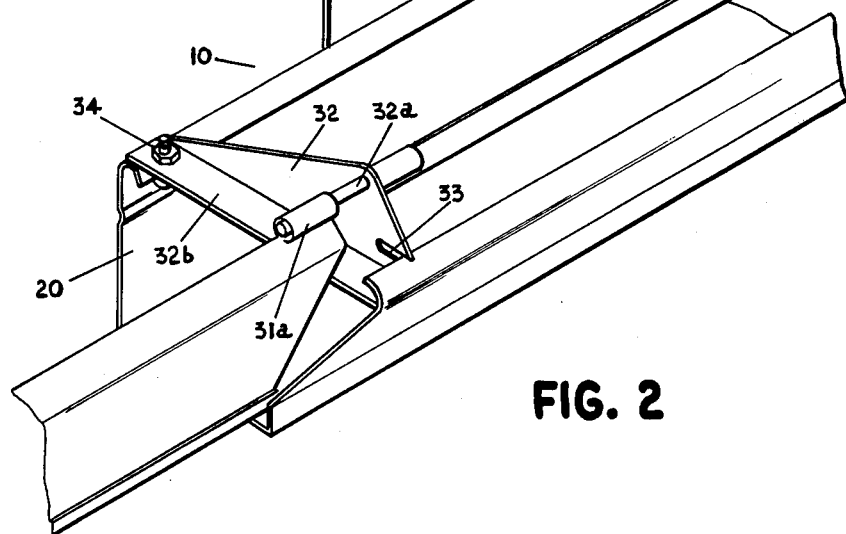
FIG. 2 is an enlarged partial perspective view of a portion of the controlled feeder and poultry cages shown taken from II of FIG. 1.

The actuating means 40 for top cover assembly 30 includes a main cable 41 positioned along cages 1, a connector cable 42 connected thereto which extends through a cable tube 43 integrally mounted on poultry cages 1 by means of hog rings 44 and which is connected to top cover 31 by means of a connector 42a attached to a spring 45 in turn attached to a cotter pin 46 (all shown in FIG. 2).

The actuating means 40 (FIG. 1) is interconnected to top cover 31 at various spaced positions along the front of poultry cages 1 by insertion of cotter pin 46 through an aperture in top cover and by expansion of the bottom portion of the pin. As tension is applied to cable 41, each connector cable 42 will act to upwardly displace top cover 31 from the open position of FIG. 5 to the closed position shown in FIG. 6. A mechanized drive system is attached to the other end of cable 41 (not shown) to provide a fully automated control means 40.

Figure 7:
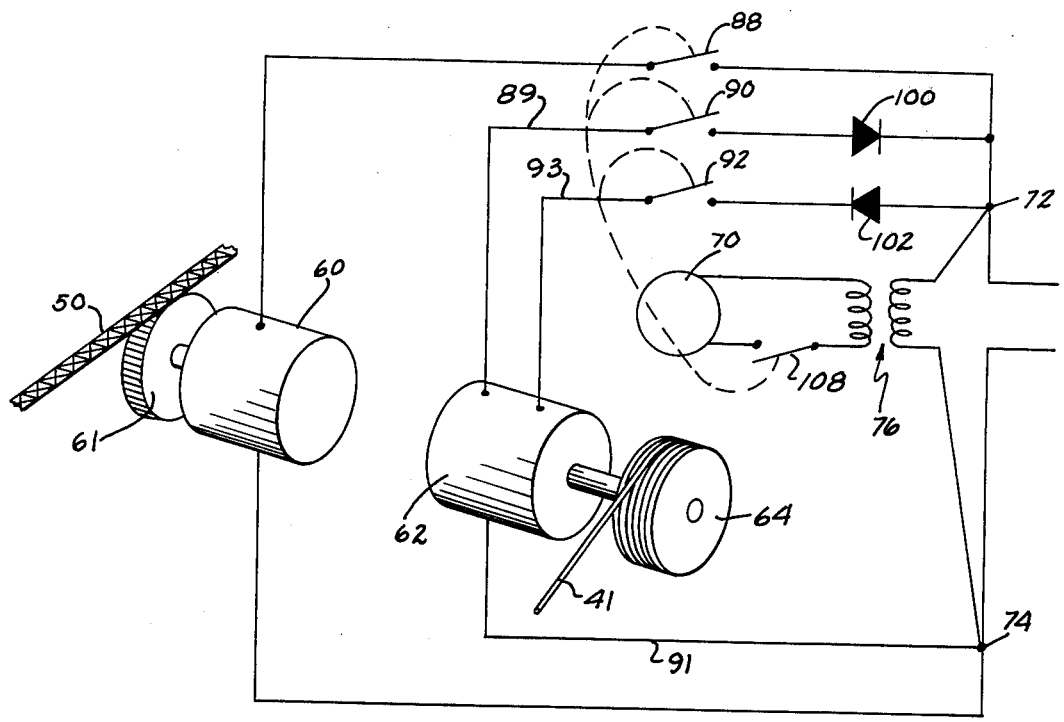
FIG. 7 is a circuit diagram and a representative electrical control mechanism for controlling the operation of the feeder.
Figure 7:
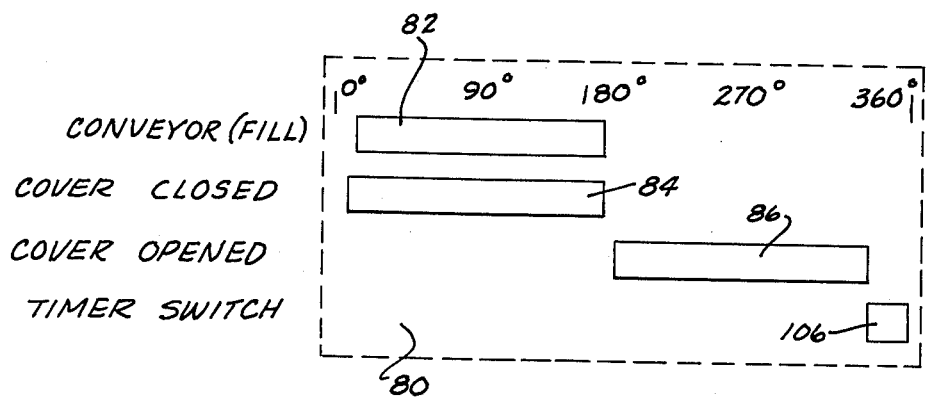

The control means for controlling the movement of the chain 50 within the trough 20 and also the actuation of the cable 41 is schematically disclosed in FIG. 7, it being understood that the drive mechanism for the chain 50 is well known within the art as disclosed in the above cited patents and the actuator for the cable 41 is merely a drum which when rotated in one direction exerts a pulling force on the cable 41 and when rotated in the other direction releases such pulling force to permit the top cover 31 to open. As shown in FIG. 7, the electric motor 60 drives the chain 50 by means of the sprocket 61. Electric motor 62 drives the drum 64 which in turn actuates the cable 41. The electrical control means for the apparatus to drive the electric motors 60 and 62 includes a timer motor 70 actuated by A.C. power across leads 72 and 74 through step down transformer 76. Timer motor 70 drives a switch drum 80 (shown expanded) having camming means 82, 84 and 86 thereon to control switches 88, 90, and 92, respectively. Conveyor motor 60 is connected across leads 72 and 74 through switch 88. Motor 62 is connected across leads 72 and 74 through lines 89 and 91, switch 90 and rectifier 100 and also line 93, switch 92, and rectifier 102.

In accordance with this control means, cam 82 closes switch 88 to thereby connect motor 20 across leads 72 and 74. This causes the chain 50 or other equivalent means, to carry the feed from a hopper and transport it throughout the length of a circuitous trough 20. This filling operation continues for a period of time shown for example by its continued operation during 180° rotation of the drum. At this same time, cam 84 closes switch 90 to cause current to flow from lead 72, through rectifier 100, to switch 90 in line 89, through motor 62, through line 91 and back to lead 74 to actuate motor 62 in one direction. This causes the drum 64 to be rotated in a direction to wind the cable 42 on the drum resulting in a force being exerted on cable 41 to thus lift and close the cover 31. After a time, as determined by the length of the cams 82 and 84, which time is sufficient to distribute feed throughout the length of the trough 20, switches 88 and 90 are opened. Almost simultaneously, or shortly thereafter, cam 86 closes switch 92 causing current to flow through rectifier 102 and motor 62 in a reverse direction and thus reversing the motor and unwinding cable 41 from the drum 64. Rotation of the drum 64 in this direction causes cable 41 to be released permitting cover 31 to rotate into open position. Since the feed has been previously distributed throughout the length of the trough 40, all the birds simultaneously have access to it, thereby feeding all the birds at substantially the same time and substantially the same amount. When the drum 80 has nearly completed one revolution, cam 106 opens up switch 108 shutting off further rotation of drum 80 until the drum is manually set into operation or is set into operation by another timing means which sets and determines the number of feeding operations per day.

OPERATION

Having described the cage system of this invention in great detail, the operation thereof should be quite obvious. Specifically, at a desired time to feed poultry houses in poultry cages 1, the switch drum 80 is set into rotatable operation. This ultimately causes the top cover 31 to be rotated into closed position by means of the motor 62 exerting a pulling force on the cable 41. In this position the end portion 31b of top cover 31 is in close contact with the lip portion 22a of trough 20.

At the same time, motor 60 causes feed to be uniformly distributed or distributed as desired along the base of trough 20 by means of chain conveyor 50 while top cover 31 is in a closed position thus preventing poultry in cages nearest the feed distribution system from receiving more than their share of the feed being distributed along the base of trough 20.

Figure 3:
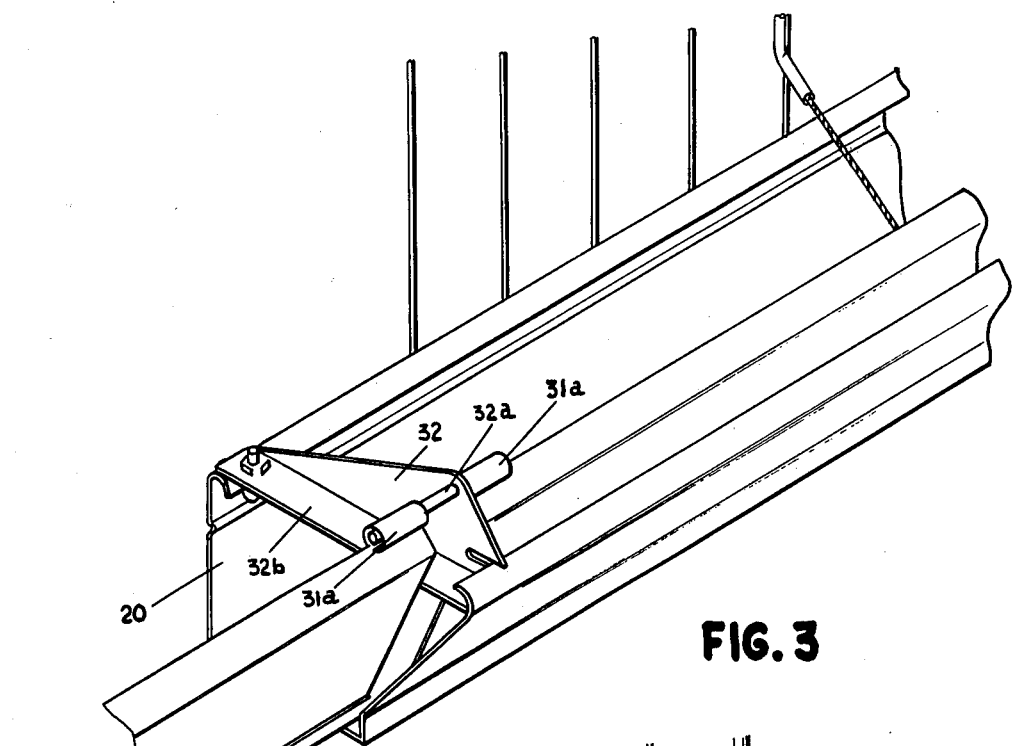
FIG. 3 is a partial view of the feeder and cage of FIG. 2 showing the trough top cover in the open position.
Figure 4:
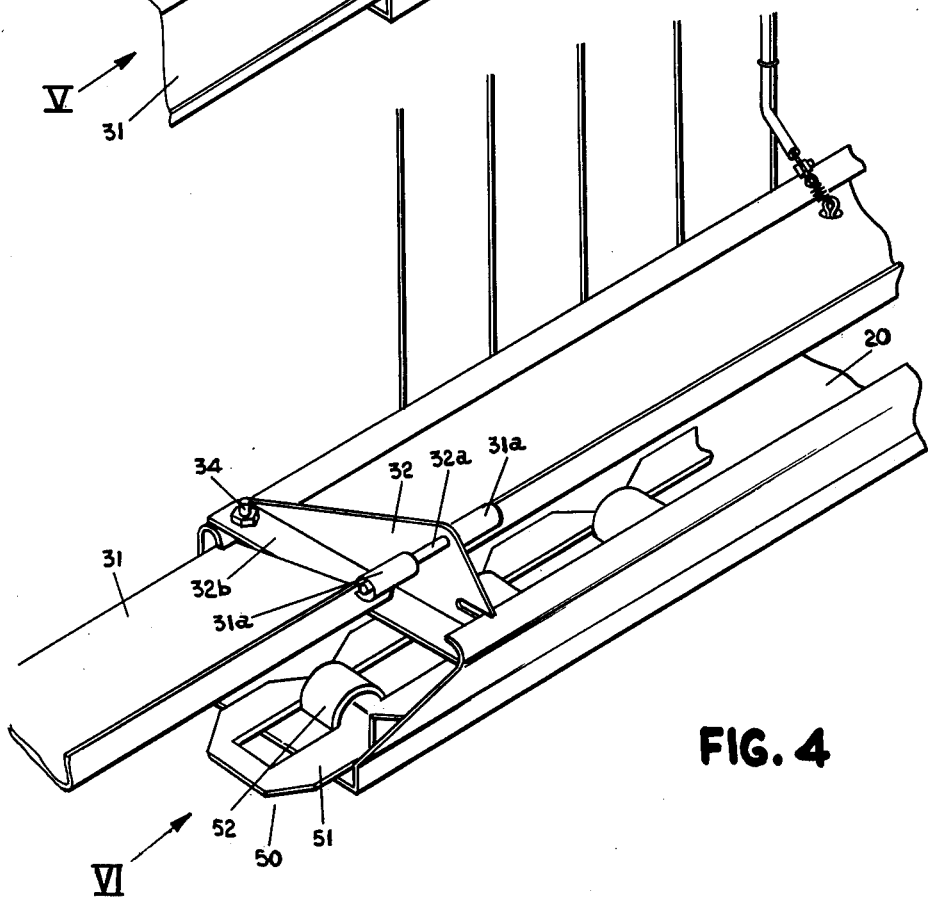
FIG. 4 is a partial view of the feeder and cage of FIG. 2 showing the trough top cover in a closed position.

At a predetermined time thereafter, when the trough is filled with feed at a desired level above the swinging movement of tip 31, motor 60 stops, motor 62 is reversed and top cover 31 is opened as shown in FIGS. 3 and 5 by reason of releasing tension on cable 41 so that top cover 31 is allowed to pivotally swing downward in its at rest position as pulled by gravity. With the top open, the birds are permitted to eat out of the trough. This cycle can be repeated as often as necessary to provide the proper control feeding of the birds.

As is apparent by the above description, a multiplicity of suitable materials and embodiments could be utilized in the feeder of the present invention. As shown, the feeder 20 is formed predominately of galvanized sheet steel which is conventional material used in poultry feeders.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are described as follows.

1. A poultry cage system having controlled feeding apparatus including:
   a series of cages having at least portions thereof constructed of material constructed to permit poultry within said cage to reach and feed therethrough;
   a feeding trough mounted on and along said cages adjacent said portions;
   a feed carrier in said trough and having drive means therefor;
   a movable cover means movable to a closed position to prevent access by poultry within said cage to feed within said trough and movable to an open position to permit poultry to feed from said trough through said portions;
   a cable means for actuating said cover means causing said cover means to move from closed to open position;
   said cable means running in a direction along said series of cages;
   guide means mounted on said portions of said cages at spaced intervals along said series of cages for directing and guiding portions of cable means to said cover; and
   actuating means for pulling said cable means in a direction along said series of cages and for releasing the same to effect closing and opening of said cover means; and control means for causing timed operation of said drive means for said feed carrier and of said actuating means for said cable means.

2. The system of claim 1 wherein said top cover is supported over said trough by means of a support member mounted on said trough and extending thereover.

3. The system of claim 2 wherein said top cover support member includes a protruding knob member and said top cover includes an edge portion being suitable for pivotal mounting on said knob member so as to provide a means for pivotally mounting said top cover from said support member.

4. The system of claim 3 wherein said top cover support member is generally triangular in shape with the hypotenuse of said triangular shaped member spanning the width of the trough and the apex portion of said member extending upwardly therefrom; said knob member protruding longitudinally of said trough from an apex portion of said top cover support member.

5. The cage system of claim 4 in which the trough has a bottom wall with a first upright wall adjacent said cage and extending upwardly from said bottom wall and a second upright wall spaced from said cage and extending upwardly from said bottom wall, said apex portion being located adjacent and above the second upright wall; said cover having said edge portion mounted on said knob member with the other edge portion pivotal downwardly into said trough in a direction away from said cages and minimizing the space occupied by said cover means within said trough.

6. The cage system of claim 1 including control means operably associated with said drive means and said cover means for causing the operation of said feed carrier while said cover means is in closed position to prevent access to said trough, and for causing said opening of said cover at a predetermined time after said feed carrier had filled said trough to a predetermined level.

7. The system of claim 1 in which said cable means extends along said series of cages and has a plurality of tributaries extending therefrom at spaced intervals, said tributaries being connected to said cover means for actuating said cover means.

8. The system of claim 7 in which the guide means comprises sheaths provided for said cable tributaries for guiding and directing the force exerted by said tributaries on said cover means.

* * * * *